United States Patent [19]

Paullin

[11] Patent Number: 5,505,014
[45] Date of Patent: Apr. 9, 1996

[54] LURE PROTECTOR

[76] Inventor: Philip G. Paullin, 2608 Kings Way, Laurenceville, Ga. 30244

[21] Appl. No.: 209,244

[22] Filed: Mar. 14, 1994

[51] Int. Cl.$^6$ ................................................ A01K 87/00
[52] U.S. Cl. ...................... 43/25.2; 206/315.11; 43/57.1; 220/4.23; 220/230
[58] Field of Search .................. 206/315.11; 220/4.24, 220/4.22, 4.23, 230, 339; 224/920; 43/25.2, 54.1, 57.1

[56] References Cited

U.S. PATENT DOCUMENTS

| | | |
|---|---|---|
| D. 217,663 | 5/1970 | Chamberlain . |
| 786,352 | 4/1905 | Frost . |
| 1,623,429 | 4/1927 | Martinson . |
| 2,285,888 | 6/1942 | Benton . |
| 2,627,133 | 2/1953 | Pletcher . |
| 2,699,623 | 1/1955 | Pragalz . |
| 2,767,502 | 10/1956 | Reynolds . |
| 2,878,610 | 3/1959 | Herstedt . |
| 2,932,118 | 4/1960 | Jend . |
| 2,993,293 | 7/1961 | Blout . |
| 3,086,312 | 4/1963 | Davis . |
| 3,141,258 | 7/1964 | Mayer . |
| 3,190,027 | 6/1965 | Spangler . |
| 3,199,243 | 8/1965 | Caston . |
| 3,279,008 | 10/1966 | Wallach . |
| 3,421,188 | 1/1969 | Rock . |
| 3,430,379 | 3/1969 | Wolfrum . |
| 3,453,770 | 7/1969 | Schultz . |
| 3,484,980 | 12/1969 | Wait . |
| 3,645,419 | 2/1972 | Shorrod ................................... 220/4.24 |
| 3,646,641 | 3/1972 | Röben . |
| 3,769,741 | 11/1973 | Hessler et al. . |
| 3,800,456 | 4/1974 | Rowe . |
| 3,940,873 | 3/1976 | Lawless . |
| 3,941,159 | 3/1976 | Toll . |
| 3,950,881 | 4/1976 | Hays . |
| 4,015,361 | 4/1977 | O'Reilly et al. . |
| 4,081,923 | 4/1978 | Pruncutz . |
| 4,121,368 | 10/1978 | Norwood . |
| 4,203,245 | 5/1980 | Peterson . |
| 4,216,604 | 8/1980 | Starke . |
| 4,418,490 | 12/1983 | Ancona . |
| 4,441,274 | 4/1984 | Masur . |
| 4,452,003 | 6/1984 | Deutsch . |
| 4,597,216 | 7/1986 | Björshol . |
| 4,614,054 | 9/1986 | Fovenyessy . |
| 4,667,433 | 5/1987 | Thompson . |
| 4,757,637 | 7/1988 | Christensen ............................. 43/57.1 |
| 4,831,772 | 5/1989 | Gillespie . |
| 4,863,054 | 9/1989 | Capetta ................................... 220/4.23 |
| 4,884,357 | 12/1989 | Clifford ................................... 43/25.2 |
| 4,920,683 | 5/1990 | Weber ..................................... 43/25.2 |
| 4,944,111 | 7/1990 | Daniel . |
| 5,020,264 | 6/1991 | Demski . |
| 5,096,084 | 3/1992 | Wells ....................................... 220/4.22 |
| 5,269,430 | 12/1993 | Schlavitz et al. ........................ 220/4.23 |
| 5,354,539 | 10/1994 | Hovatter ................................... 220/339 |

FOREIGN PATENT DOCUMENTS

| | | | |
|---|---|---|---|
| 2642047 | 7/1990 | France .................................... 220/230 |
| 8911791 | 12/1989 | WIPO ...................................... 43/57.1 |

*Primary Examiner*—Kurt Rowan
*Assistant Examiner*—James Miner
*Attorney, Agent, or Firm*—Renner, Otto, Boisselle & Sklar

[57] ABSTRACT

A lure protector is formed from a sheet of flexible material with an outer boundary that is symmetrical about a fold line which intersects the boundary at two locations to define first and second portions. The sheet is foldable along the fold line to bring the first and second portions into overlapping engagement with each other on one side of the fold line to enfold a lure between them. A tab extends from the fold line in a direction opposite from the one side of the fold line for facilitating pulling the lure protector away from a lure enfolded between the first and second portions. Fastening means are located along the perimeter for releasably securing the first and second portions to each other so as to retain the lure enfolded between the first and second portions. This arrangement makes it possible to protect a lure from entanglement with nearby rods and lines when not in use, and at the same time the protector may be easily and quickly removed for use when the fisherman determines that a change in rod and lure is advisable.

16 Claims, 1 Drawing Sheet

LURE PROTECTOR

FIELD OF THE INVENTION

The present invention relates to a device for protecting a fishing lure from entanglement with other gear and for protecting people from fishing lures that are left secured to fishing line, rod and reel.

BACKGROUND OF THE INVENTION

Many fishermen carry a number of fishing rods with different lures attached to the line associated with each rod. This makes it possible to change lures simply by putting one rod down and picking another up. This technique is frequently used in the sport of competitive bass fishing where the competition is based on the number of fish caught in a limited amount of time. In such competitions, there is no time for removing a lure from a line and reattaching a different lure to the same line. Instead it is the custom, as noted above, to bring a relatively large number of rods, each equipped with a different lure. As soon as the fisherman determines that the fish are not biting on the lure he is then using, a change may be effected very rapidly in the manner described.

An obvious difficulty in such situations is the possibility that hooks on the lures will become entangled with other fishing paraphernalia, resulting in a tangle of equipment which is time consuming to untangle and therefore a serious disadvantage in a competitive situation. The need to protect the people who are nearby is obvious.

Numerous devices have been designed over the years that serve to encapsulate a fishing lure and secure it to a fishing rod. The applicant is aware of the following United States Patents showing devices that hold fishing lures for one purpose or another:

| | | | |
|---|---|---|---|
| 5,020,264 | 4,944,111 | 4,831,772 | 4,667,433 |
| 4,597,216 | 4,452,003 | 4,441,274 | 4,418,490 |
| 4,216,604 | 4,203,245 | 4,015,361 | 4,614,054 |
| 4,121,368 | 4,081,923 | 3,950,881 | 3,941,159 |
| 3,940,873 | 3,800,456 | 3,769,741 | 3,646,641 |
| D.217,663 | 3,484,980 | 3,453,770 | 3,430,379 |
| 3,199,243 | 3,141,258 | 2,993,293 | 2,932,118 |
| 2,878,610 | 2,699,623 | 2,627,133 | 2,285,888 |
| 1,623,429 | 786,352. | | |

The large number of patents and the span of time over which they continue to be issued is testimony to continuing demand for an improved and effective lure protector.

SUMMARY OF THE INVENTION

The present invention provides a lure protector comprising a sheet of flexible material with an outer boundary that is symmetrical about a fold line which intersects the boundary at two locations to define first and second portions. The sheet is foldable along the fold line to bring the first and second portions into overlapping engagement with each other on one side of the fold line to enfold a lure between them. A tab means extends from the fold line in a direction opposite from the one side of the fold line for facilitating pulling the lure protector away from a lure enfolded between the first and second portions. Fastening means are located along the perimeter for releasably securing the first and second portions to each other so as to retain the lure enfolded between the first and second portions. This arrangement makes it possible to protect a lure from entanglement with nearby rods and lines when not in use, and at the same time the protector may be easily and quickly removed for use when the fisherman determines that a change in rod and lure is advisable.

These and other features of the present invention will become clear from the following specification and the appended claims when read in the light of the accompanying Figures.

DESCRIPTION OF A PREFERRED EMBODIMENT

Figure 1:
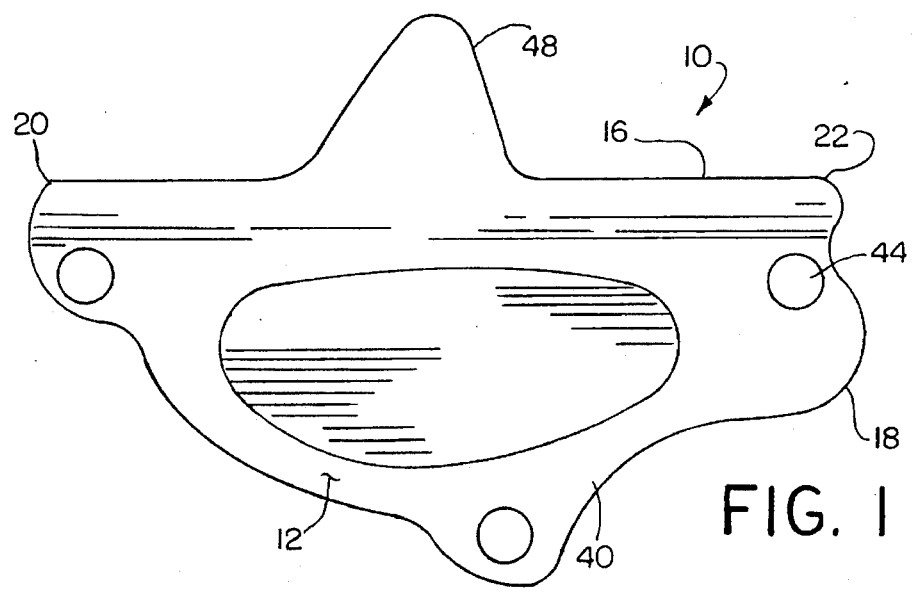
FIG. 1 is a side elevation view of a lure protector constructed in accordance with the present invention.

FIG. 1 illustrates a lure protector constructed in accordance with the present invention. The lure protector 10 is formed from a resilient, flexible sheet-like material, and preferably moldable plastic material which may also be transparent. The lure protector 10 is intended to surround a fishing lure and to protect it from entanglement with other fishing equipment and to protect those near the lure from being unintentionally hooked. Accordingly the material from which the lure protector is made must be thick enough and tough enough to resist penetration by a sharp fishing hook.

Figure 2:
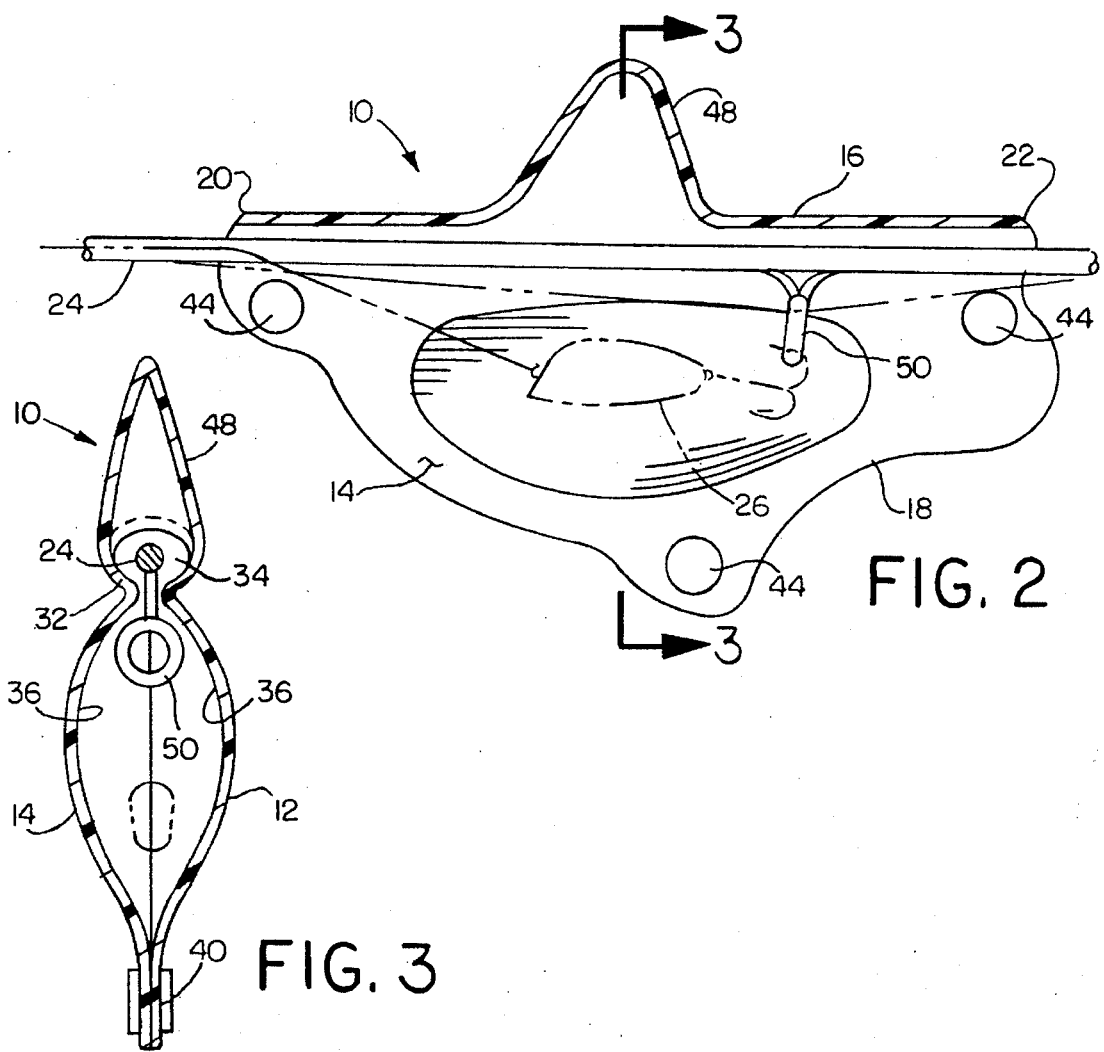
FIG. 2 is a sectional side elevation view of the lure protector of FIG. 1 shown installed on a fishing rod with the fishing line and a fishing lure shown in phantom.
Figure 3:
FIG. 3 is a view looking generally in the direction of arrows 3—3 of FIG. 2.

The sheet of material from which the lure protector 10 is made is divided into two symmetrical portions 12 and 14 (FIGS. 1, 2, and 3) by a fold line 16 which intersects the outer boundary 18 of the lure protector at two locations 20 and 22 (FIG. 2). The lure protector 10 is shaped to allow it to be folded along the fold line 16 to enfold a fishing rod 24 and a lure 26.

Each portion 12, 14 of the lure protector 10 is shaped to grip the rod 24 and retain the lure 26. To this end each portion 12, 14 has walls 32 (FIG. 3) adjacent the fold line 16 that together define a substantially cylindrical passage 34. When the lure protector 10 is folded about the fold line 16, the passage 34 substantially surrounds the rod 24. This arrangement serves to hold the lure protector against movement transverse to the axis of the rod 24.

Each portion 12, 14 of the lure protector 10 has a concave recess 36 which receives the lure 26. The two recesses 36 face each other (see FIG. 3), and so when the lure protector is in place, the recesses 36 together surround the lure 26. Outside the recesses 36, the two portions 12 and 14 of the lure protector 10 have generally planar peripheral portions 40. These peripheral portions 40 are brought into face to face overlapping engagement when the lure protector 10 is folded around the fold line 16.

Releasable fasteners 44 are provided to hold the two portions 12, 14 of the lure protector 10 folded about a rod 24 and lure 26. Preferably these fasteners 44 are magnets which are mounted in pairs in the planar peripheral portions 40 of each portion 12, 14 of the lure protector 10. The fasteners may also be hook and loop fasteners. When the lure protector 10 is made of a moldable material, the magnets may be molded in place, thus tending to provide a permanent mounting for the magnets which must survive in a relatively harsh environment. As illustrated in the Figures, three such pairs of magnets are so mounted, two pairs at opposite ends of the lure protector 10 near the rod passage 34, and one pair about midway between these two. On larger lure protectors there may be two or more pairs of magnets between the pairs at opposite ends of the lure protector. This arrangement of magnets 44 assures that the lure protector 10 will not unintentionally release the rod 24 about which it is wrapped nor allow the lure 26 within the lure protector to come loose unintentionally.

The tab 48 serves as a grip for use in removing the lure protector 10 from the rod 24 and lure 26 whenever the fisherman wants to use them and without any unnecessary delay. Because the fasteners 44 are releasable, simply pulling on the tab 48 causes the fasteners 44 to separate and the lure 26 to be released. The position of the tab 48 is such that when removing the lure protector 10, the fisherman is always pulling away from the lure and its sharp hooks. There is much less danger of getting hooked by the lure than in prior art designs where it is necessary to manipulate the device surrounding the lure. In the lure protector of the present invention the hand motions involved in preparing a rod and lure for use by removing the lure protector begin away from the lure and do not cross or travel through the space where the hooks are located.

Once the lure protector 10 has been removed, it can be set aside until the fisherman decides that he should be using a different rod and lure. Then the lure protector 10 is simply opened, and replaced around the rod 24, with the rod passing through the passage 34. The middle pair of magnets 44 are then separated to open the chamber defined by the two recesses 36, and the lure 26 is placed within. The two portions 12, 14 are then returned to their overlapping position, and the lure is once again safely enfolded within.

Although a single embodiment has been described, other variations on the present invention are contemplated. For example, individual magnets need not be used. Instead, the sheet material of which the lure protector 10 is made could be magnetic, or strips of magnetic material could be molded into or otherwise provided at the peripheral portions 40 of the lure protector 10. Alternately, the material could be ferromagnetic but unmagnetized. Magnets could then be mounted into only one of the two portions 12, 14.

As shown in the Figures, the lure protector 10 is generally in the shape of a fish, with the tab 48 representing a dorsal fin. Other configurations are possible, so long as the functional features of the present invention are satisfied. The lure protector 10 may be manufactured in various sizes to accommodate different size lures and different diameter rods.

What is claimed is:

1. A lure protector comprising:

a sheet of flexible material with an outer boundary and a fold line intersecting the outer boundary at two locations to define first and second portions, the sheet being foldable along the fold line to bring the first and second portions into overlapping engagement with each other on one side of the fold line to enfold a lure between the first and second portions;

a tab extending from the fold line in a direction opposite from the one side of the fold line and defining a pocket proportioned to receive an eye of a fishing rod around which the lure protector may be wrapped;

fastening means along the outer boundary for releasably securing the first and second portions to each other so as to retain the lure enfolded between the first and second portions.

2. The lure protector of claim 1 wherein the flexible sheet material is a transparent material.

3. The lure protector of claim 1 wherein the fastening means includes a magnet mounted along the outer boundary of one of the first and second portions.

4. The lure protector of claim 3 wherein magnets of opposing polarity are mounted along the outer boundary of the first and second portions of the sheet of material.

5. The lure protector of claim 3 wherein the material is a moldable plastic material and the magnet is molded in position along the perimeter of at least one of the first and second portions.

6. The lure protector of claim 1 wherein the sheet material is a moldable plastic material.

7. The lure protector of claim 6 wherein the first and second portions define an arcuate cross section proportioned to substantially surround a fishing pole when the first and second portions are folded about the fold line and brought into overlapping engagement.

8. The lure protector of claim 6 wherein at least one of said first and second portions is molded with a concave pocket for receiving a lure when the first and second portions are in overlapping relationship.

9. The lure protector of claim 8 wherein the first and second portions each have a generally planar perimeter portion.

10. The lure protector of claim 8 wherein the first and second portions define an arcuate cross section proportioned to substantially surround a fishing pole when the first and second portions are folded about the fold line and brought into overlapping engagement.

11. The lure protector of claim 8 wherein the tab means defines a hollow pocket proportioned to receive an eye of a fishing rod.

12. The lure protector of claim 1 wherein the fastening means includes hook and loop fasteners.

13. The lure protector of claim 1 including wall means for surrounding a portion of a fishing rod, the wall means defining a generally cylindrical passage parallel the fold line.

14. The lure protector of claim 13 including gripping means for positioning the lure protector axially and transversely with respect to a fishing rod when the lure protector surrounds a portion of a fishing rod.

15. The lure protector of claim 14 wherein the gripping means includes the pocket of the tab means and the generally cylindrical passage defined by the wall means.

16. A lure protector comprising:

a sheet of flexible material with an outer boundary and a fold line intersecting the outer boundary at two locations to define first and second portions, the sheet being foldable along the fold line to bring the first and second portions into overlapping engagement with each other on one side of the fold line to enfold a lure between the first and second portions;

wall means for surrounding a portion of a fishing rod, the wall means defining a generally cylindrical passage parallel the fold line;

a tab means extending from the fold line in a direction opposite from the one side of the fold line for facilitating pulling the lure protector away from a lure enfolded between the first and second portions;

fastening means along the outer boundary for releasably securing the first and second portions to each other so as to retain the lure enfolded between the first and second portions; and gripping means for positioning the lure protector axially and transversely with respect to a fishing rod when the lure protector surrounds a portion of a fishing rod, the gripping means including the hollow pocket of the tab means and the generally cylindrical passage defined by the wall means.

* * * * *